Patented Apr. 19, 1938

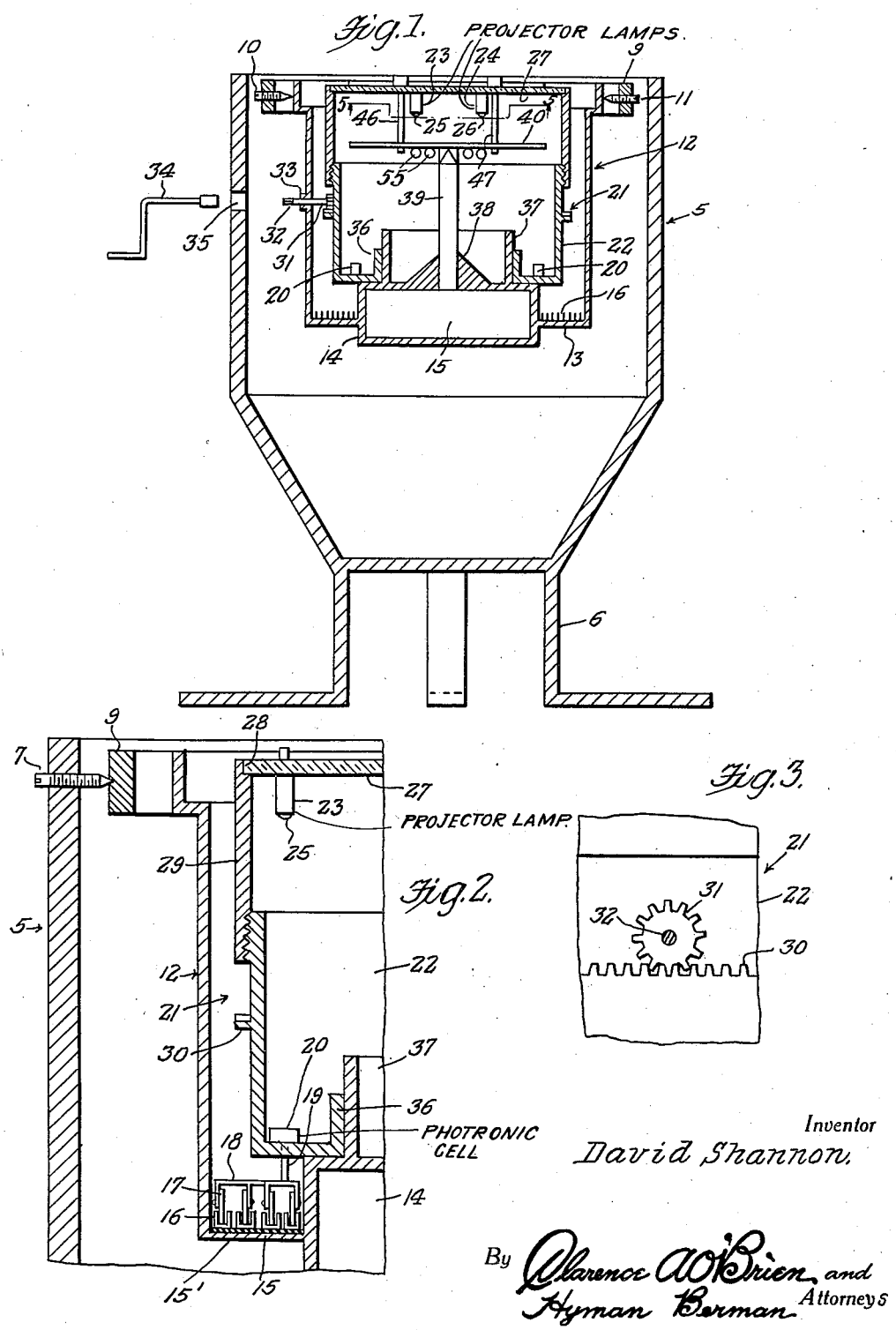

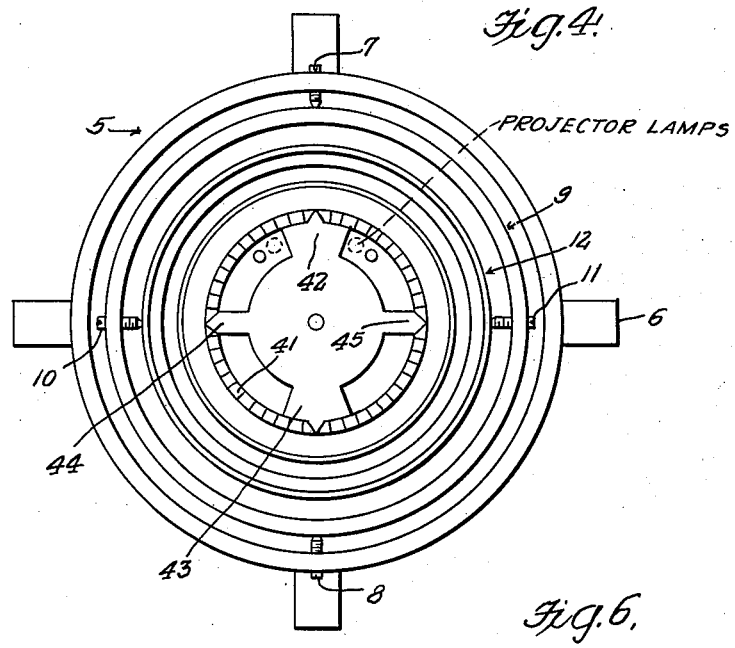
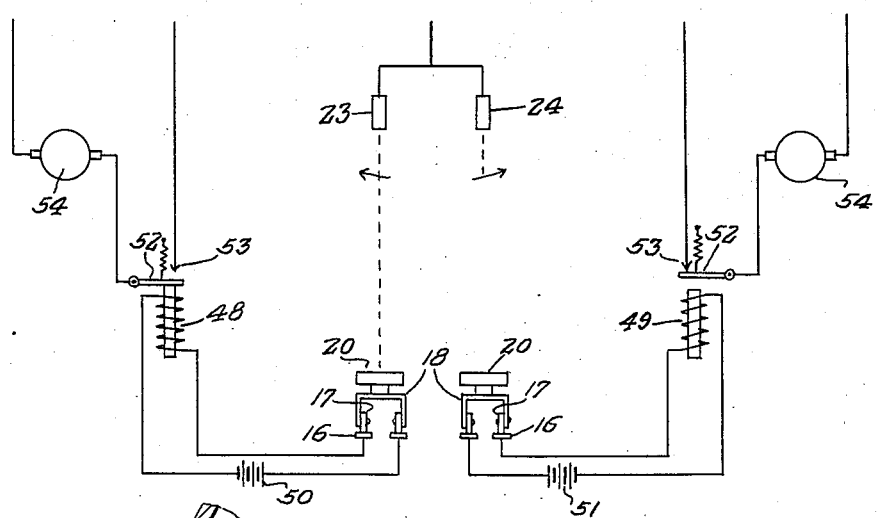
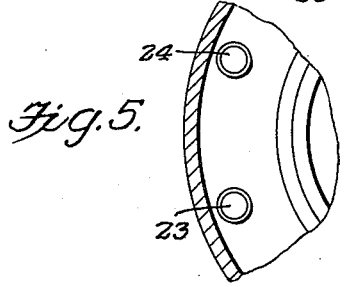

2,114,479

UNITED STATES PATENT OFFICE 2,114,479

AUTOMATIC STEERING COMPASS

David Shannon, New Orleans, La.

Application May 21, 1936, Serial No. 81,097

3 Claims. (Cl. 33—204)

My invention relates generally to an automatic steering compass for automatically controlling the steering mechanism of a boat, and an important object of my invention is to provide an automatic steering compass which is not only more efficient and rugged, but which is simpler and less expensive than existing steering compasses.

Another important object of my invention is to provide an automatic steering compass of the character indicated which can be easily and quickly converted to act as an ordinary compass for hand steering purposes.

Another important object of my invention is to provide an automatic steering compass of the character indicated which includes electrical control circuits for controlling the electric motor and the boat steering mechanism, the said circuits being conditioned for operation by compass-position controlled photronic cell means.

Other important objects of my invention will be apparent from a reading of the following description in connection with the drawings, wherein for purposes of illustration I have shown a preferred embodiment of my invention.

In the drawings:—

Figure 1 is a transverse vertical sectional view taken through an embodiment of the invention.

Figure 2 is an enlarged transverse vertical sectional view similar to Figure 1 but showing the contact means operating between the compass and the outer compass case.

Figure 3 is a sectional elevational view showing the gear on the compass and the gear operating pinion.

Figure 4 is a top plan view of Figure 1.

Figure 5 is a horizontal sectional view taken through Figure 1 and looking upwardly and showing the beam lamps.

Figure 6 is a wiring diagram showing the arrangement of the control circuits.

Referring in detail to the drawings, the numeral 5 generally designates the compass stand which is preferably of suitable cylindrical shape and includes the legs 6 for resting upon and attachment to a suitable supporting surface.

At diametrically opposite points gimbals 7 and 8 project adjustably through the upper part of the compass stand and engage the gimbal band or ring 9 which is concentrically spaced within the compass stand and has at diametrically opposite points at 90 degrees distance from the gimbals 7 and 8 the gimbals 10 and 11 which extend through the band and supportably engage the outer compass case 12 which is concentrically spaced within the gimbal ring 9.

The bottom 13 of the outer compass case 12 has the cylindrical chamber 14 which contains a weight 15 for holding the compass on the horizontal.

Surrounding the compartment 14 and resting on the floor 13 of the outer compass case 12 is a dielectric strip 15' on which are mounted the U-shaped cross-section tracks 16 with which are arranged to engage the companion contactors 17 which are mounted on the yokes 18 which are carried by the arms 19 and which connects with a photronic cell 20 which rests on the bottom of the lower section of the compass case which is generally designated 21. There are two of the photronic cells 20 spaced circumferentially apart at the same distance as are spaced the beam producing lamps 23 and 24 which have convex lenses 25 and 26 to concentrate the beam on the photronic cells. The beam lamps 23 and 24 are supported in the glass top 27 which is seated in a circumferential groove 28 in the top of the upper section 29 of the compass case 21.

On the exterior of the lower section 22 of the compass case is the annular rack or gear 30 which is engaged by a pinion 31 supported on a shaft 32 in a bearing 33 traversing the side of the outer compass case 12 and in a position to be engaged by a crank 34 when inserted through the compass opening 35 in the side of the compass stand 5. The object of the gear, the pinion and the crank 34 is to provide means for giving the compass case 21 an initial position according to the course which the compass is to steer automatically.

The upper compass case section 29 is threaded exteriorly on the upper part of the lower compass case section 22, to facilitate assembly and disassembly.

The bottom of the lower section 22 of the compass case has an opening at its center from which rises the flange 36 which receives the tubular portion 37 on the upper end of the compartment 14. Concentrically spaced within the tubular portion 37 is the support 38 which supports in a vertical position the compass post 39 which has on its upper end the circular compass chart 40 which is thereby supported in spaced relation below the glass top 27.

The compass chart is provided with the usual marginal graduations 41, but segmental portions within the circular graduations 41 are cut away to provide at the north and south points the wide segmental portions 42 and 43 and at the east and west points the narrower portions 44 and 45, thereby defining openings extending between the north and west points and between the west point and the south point, and between the south point and the west point and between the north point and the east point. The compass chart is made opaque so that objects under the compass chart will not be visible except through the said openings. Encased bundles 55 of magnetized wire are fixed to the underside of the card on opposite sides of its center to provide the necessary magnetic directional operation of the card.

Depending from the glass top 27 and into the openings extending between the north point and the east point and between the north point and the west point, are the stop screws 46 and 47 whose purpose is to stop the swing of the compass chart in either direction beyond a certain number of degrees, so as to properly effect the electrical control circuit to the steering mechanism. The stop screws 46 and 47 can be screwed up out of engagement with the compass chart so as to free the compass to swing through any arcs, so as to condition the compass to be used for hand steering.

This compass can be corrected for semi-circular and quadrantal deviations in the same manner and by the same means as are employed for such adjustments and corrections on any standard compass.

With the compass properly adjusted according to the predetermined sailing direction by operation of the crank 34 in conjunction with the pinion 31, the beam lamps 23 and 24 will throw concentrated beams of light down on the photronic cells 20 therebelow and this produces conductivity in the otherwise non-conductive photronic cells which establishes energization of the circuit to the relay magnets 48 and 49 which include the batteries 50 and 51, the contactors 17, 17 and the tracks 16 being in engagement through the rotation of the compass.

The beams of the lamps pass downwardly through the openings on the opposite sides of the north segment 42 of the compass chart. The radially opposed edges of the north segment 42 are utilized as beam cutters. That is, when the compass casing is swung relative to the compass chart either to the right or to the left, a point in the swing of the compass casing may be reached wherein the edge of the segment 42 cuts off a portion or the whole of a beam and thereby deprives the corresponding photronic cell of conductivity, so as to deenergize the electrical circuit at that side and thereby cause the corresponding relay arm 52 to be drawn away from its contact 49 and close contact 53 and thereby energize the steering mechanism motor 54. During this action the remaining photronic cell will be fully conductive because of the freedom of the beam from the corresponding beam lamp to play thereon through the opening at the opposite side of the segment 42, so that the steering mechanism of the boat will be actuated to steer in a direction compensating for the divergence from the predetermined course. Separate steering mechanism controlling motors 54 may be utilized or a single reversible motor.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. An automatic steering compass of the character described, said compass comprising a compass stand, a gimbal ring, gimbals on the stand and supportably engaged with the gimbal ring, an outer compass case supportably engaged with the said gimbal ring, a vertical axis compass carried by said outer compass case, said compass including a revoluble card, an inner compass case supported revolubly in said outer compass case, circumferentially spaced photronic cells supported in a lower part of said inner compass case below said card, beam producing lamps carried by said inner compass case above said card and vertically axially aligned with said photronic cells, said compass card being opaque but having circumferentially spaced openings defining edges each normally in substantial registry with a respective cell and its lamp, and steering mechanism controlling circuits in which said photronic cells respectively are interposed.

2. An automatic steering compass of the character described, said compass comprising a compass stand, a gimbal ring, first gimbals on the stand and supportably engaged with the gimbal ring, an outer compass case, second gimbals on the gimbal ring supportably engaged with said outer compass case and revoluble relative thereto, a vertical axis compass carried by said inner compass case, said compass including a revoluble opaque card formed with circumferentially spaced openings therein, circumferentially spaced photronic cells supported in a lower part of said inner compass case below said card, beam producing lamps carried by said inner compass case above and registrable with the openings in said card and vertically axially aligned with said photronic cells, steering mechanism controlling electrical circuits in which said photronic cells are interposed, and means extensible through said outer compass case and engageable with said inner compass case for adjustably rotating said inner compass case relative to said outer compass case.

3. An automatic steering compass of the character described, said compass comprising a compass stand, a gimbal ring, first gimbals on the stand and supportably engaged with the gimbal ring, an outer compass case, second gimbals on the gimbal ring and supportably engaged with said outer compass case, an inner compass case within said outer case and revoluble relative thereto, a vertical axis compass carried by said inner compass case, said compass including a revoluble opaque card formed with circumferentially spaced openings therein, circumferentially spaced photronic cells supported in a lower part of said inner compass case below said card, beam producing lamps carried by said inner compass case above and registrable with the openings in said card and vertically axially aligned with said photronic cells, steering mechanism controlling electrical circuits in which said photronic cells are interposed, means extensible through said outer compass case and engageable with said inner compass case for adjustably rotating said inner compass case relative to said outer compass case, and stop means depending from an upper part of said inner compass case and into openings formed at opposite sides of a portion of said compass card for stopping further swing of the compass card in a position to cut off the beam from a beam producing lamp so as to reduce the conductivity of the corresponding photronic cell.

DAVID SHANNON.